United States Patent [19]

Crisler et al.

[11] Patent Number: 5,295,140
[45] Date of Patent: Mar. 15, 1994

[54] METHOD FOR MULTI-PURPOSE UTILIZATION OF RESOURCES IN A COMMUNICATION SYSTEM

[75] Inventors: Kenneth J. Crisler, Wheaton; Michael L. Needham, Palatine, both of Ill.

[73] Assignee: Motorola, Inc., Schaumburg, Ill.

[21] Appl. No.: 676,924

[22] Filed: Mar. 28, 1991

[51] Int. Cl.$^5$ ............................................... H04J 3/16
[52] U.S. Cl. ................................... 370/94.1; 370/95.3
[58] Field of Search ................... 370/94.1, 95.1, 95.3, 370/85.1, 85.2, 85.7, 104.1, 93; 340/825.5, 825.51

[56] References Cited

U.S. PATENT DOCUMENTS

| | | | |
|---|---|---|---|
| 4,107,608 | 9/1978 | Suburi | 370/95.3 |
| 4,472,802 | 9/1984 | Pin et al. | 370/95.3 |
| 4,480,328 | 10/1984 | Alaria et al. | 370/95.3 |
| 4,504,946 | 3/1985 | Raychaudhuri | 370/95.3 |
| 4,612,637 | 9/1986 | Davis et al. | 370/95.3 |
| 4,641,304 | 2/1987 | Raychaudhuri | 370/95.3 |
| 4,754,453 | 6/1988 | Eizenhofer | 370/95.1 |
| 4,763,322 | 8/1988 | Eizenhofer | 370/95.1 |
| 4,764,920 | 8/1988 | Furuya | 370/95.1 |
| 5,012,469 | 4/1991 | Sardana | 370/95.1 |
| 5,081,622 | 1/1992 | Nassehi et al. | 370/85.1 |
| 5,103,445 | 4/1992 | Ostlund | 340/825.08 |

OTHER PUBLICATIONS

William Stallings "Data and Computer Communication", 1985 pp. 312-317.

"Packet Reservation Multiple Access For Local Wireless Communications", Goodman et al., IEEE publication, pp. 701-706 (Jun. 1988).

Multiple Access Protocols for Data Communications via VSAT Networks, Wolejsza et al., IEEE Communications Magazine, pp. 30-39 (July 1987).

Performance Analysis of Virtual Time CSMA, Meditch et al., IEEE Publication, pp. 242-251 (Apr. 1986).

Virtual Time CSMA: Why Two Clocks Are Better Than One, Molle et al., IEEE Transactions on Communications, pp. 919-933 (Sep. 1985).

Multiaccess Protocols in Packet Communication Systems, Tobagi, IEEE Transactions On Communications, pp. 468-488 (Apr. 1980).

*Primary Examiner*—Benedict V. Safourek
*Assistant Examiner*—Ajit Patel
*Attorney, Agent, or Firm*—Steven G. Parmelee

[57] ABSTRACT

A communication resource is subdivided as a function of time into a plurality of time slots (210), which may then be further subdivided on a non-periodic basis into a number of sub-slots (220). In a slot or sub-slot, communication units (101) may utilize the communication resource according to a specific set of access methods defined for that slot or sub-slot. In one embodiment the time slots are subdivided on a non-periodic basis into a least two random access sub-slots, during which communication units may either request one or more reserved time slots, or send unreserved data packets (240). In response to requests for reserved time slots from a requesting communication unit, one or more reserved time slots are provided for the use of the requesting communication unit.

8 Claims, 4 Drawing Sheets

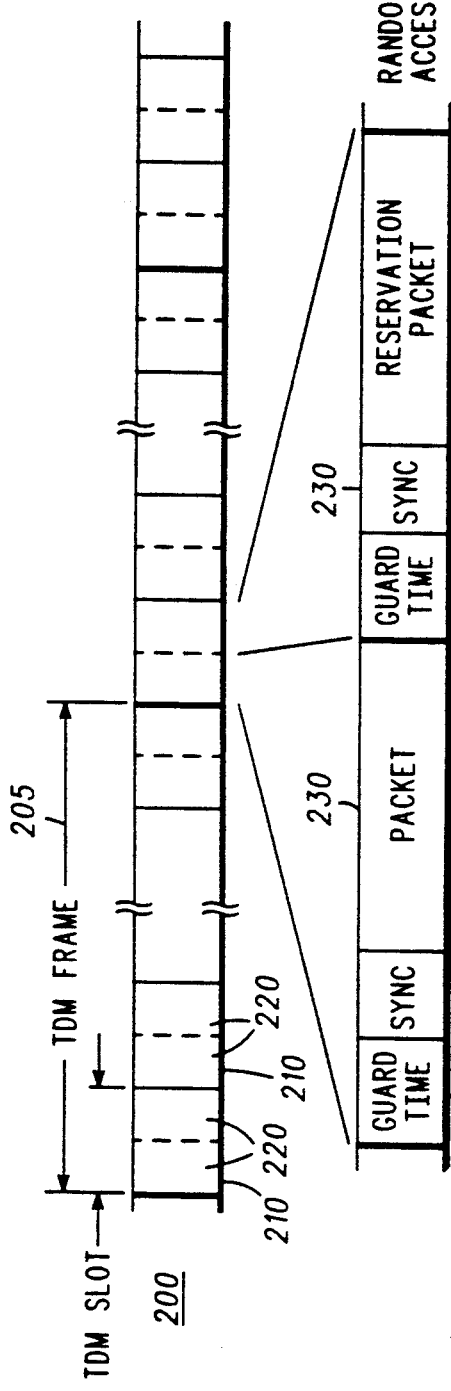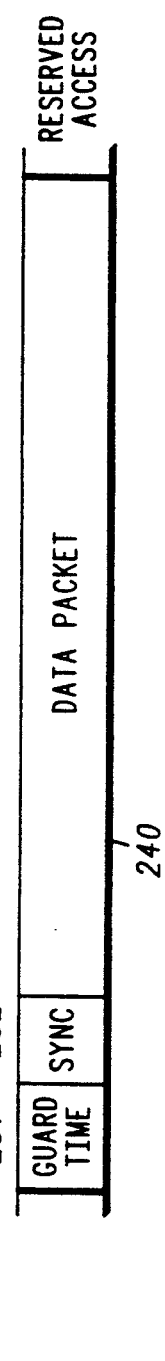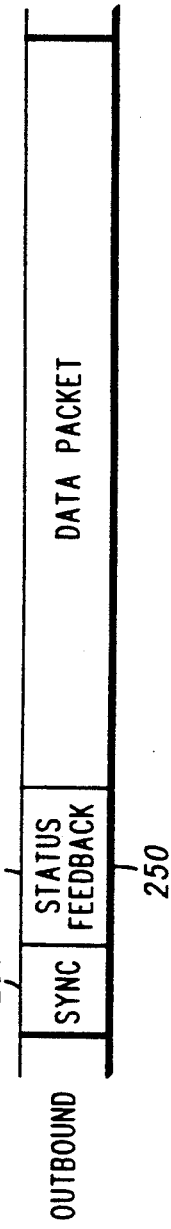

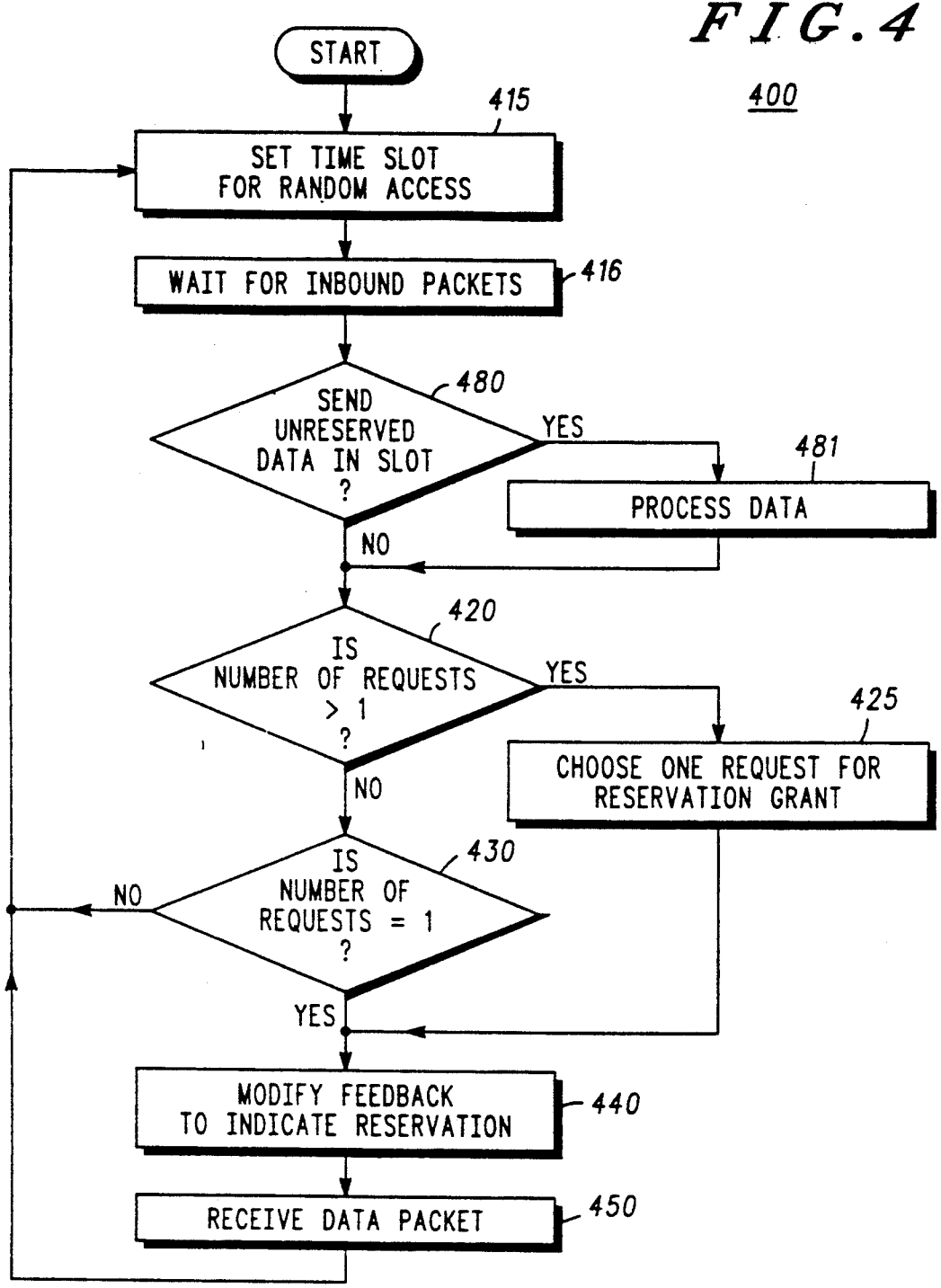

METHOD FOR MULTI-PURPOSE UTILIZATION OF RESOURCES IN A COMMUNICATION SYSTEM

FIELD OF THE INVENTION

This invention relates generally to communication systems, including but not limited to methodologies that regulate use by a plurality of competing communication units of communication resources.

BACKGROUND OF THE INVENTION

Multiple access communication systems are well understood in the art. Multiple access communication systems are designed to provide access to limited communication resources by a plurality of communication units for the purpose of transmitting communication messages, referred to as packets. The access methodology, referred to as a multiple access protocol, is chosen such that some appropriate set of performance constraints are met. Typical performance constraints include efficiency of communication resource use, communication message delay, and other similar factors. Multiple access protocols can generally be regarded as belonging to one of two general types, contention and non-contention.

Non-contention protocols are designed such that a communication unit desiring to send a packet is permitted exclusive use of a communication resource. One example of this type of protocol is time-division multiple access (TDMA) where the communication resource is divided into a plurality of time frames that are further subdivided into a plurality of time slots and each communication unit is assigned exclusive use of one or more time slots in each time frame. This type of protocol is inefficient for communication units that source substantially infrequent messages since the assigned time slot remains substantially unused by anyone in between messages. The practical number of communication units that can be accommodated by such a protocol is also limited by the delay incurred while waiting for one's assigned slot. This wait usually increases proportionally to the number of communication units that have assigned slots.

Contention protocols are characterized by communication units that actively compete with each other to gain access to the communication resource. The slotted ALOHA protocol is an example of this type of protocol. In slotted ALOHA, a communication resource is divided into a plurality of time slots. A communication unit desiring to send a packet may transmit in the first subsequent time slot, taking care not to transmit outside of the boundaries of that time slot. If no other communication unit also transmitted in that same time slot, the packet transmission is considered successful. (Note that other factors, such as communication channel noise, may ultimately result in failure of the message, but that these other factors are not related to the access protocol.) If one or more other communication units, however, did transmit a packet in the same time slot, generally all transmissions would fail due to collision. Thus contention protocols generally work well for lightly loaded systems, but performance suffers as load increases because the likelihood of collisions also increases. Further, communication messages longer than the time slot duration must be sent in a plurality of time slots and are subject to collision in each time slot used.

Reservation protocols, a sub-class of contention protocols, are also known. Reservation protocols attempt to combine certain aspects of contention and non-contention protocols to provide improved performance for a wider variety of communication system conditions. A typical reservation protocol divides a communication resource into a series of fixed-size time frames further divided into a series of time slots. The time slots are comprised of two types, a reservation time slot and a data time slot, with equal numbers of each in each time frame. The reservation time slots are generally smaller than the data time slots and are grouped together at the beginning of each time frame. A communication unit desiring access to the communication resource transmits randomly in one of the reservation time slots for the purpose of reserving an associated data time slot. If the unit successfully avoids contention and is therefore the only unit to transmit a reservation request in a given reservation time slot, it is permitted exclusive access of the associated data time slot occurring later in the time frame.

Although reservation protocols improve the effectiveness by which a communication resource may be utilized by a plurality of competing communication units, particularly when there are a wide range of communication requirements, some drawbacks exist with these schemes. A communication unit wishing access to the channel must first wait for the reservation time slots. If no messages are currently being sent, this represents a delay which would not have occurred if the unit had been allowed to transmit immediately, in random access fashion. Further delay is encountered between the time the unit successfully accesses the reservation time slot, via random access, and the time it receives confirmation of its reservation.

One particular reservation protocol, the Reservation-ALOHA (R-ALOHA) protocol, should be mentioned. Like TDMA, the communication resource is divided into time frames that are further divided into time slots. When the communication resource is unused, however, the protocol operates similarly to slotted ALOHA. When a communication unit desires to send a packet, it transmits in one of the unused time slots, referred to as a random access slot. If the transmission is successful, i.e., it does not collide with another transmission, the communication unit is permitted exclusive use of that same time slot in subsequent time frames, referred to as reserved access slots until the packet is completely transmitted. Thus the initial ALOHA transmission results in a subsequent reservation of a communication resource. (Note that some method of feedback to the communication units regarding the success or failure of initial ALOHA transmissions is necessary in order for this protocol to be effective.)

R-ALOHA is quite efficient for communication systems accommodating a wide variety of packet frequencies and sizes. However some limitations can be noted. The ultimate efficiency of the protocol is governed by the size of the random access portion of a packet relative to the complete packet, since it is only this portion that is subject to contention failure. In R-ALOHA, this size is equivalent to a time slot. There are many competing factors that contribute to the determination of time slot duration in the design of a communication system. The final embodiment may not result in optimum access protocol performance. For example, longer time slots increase transmission efficiency because requisite overhead requirements are reduced, but a longer time slot decreases the effectiveness of R-ALOHA. Also due to the contention for unused time slots in R-ALOHA, several unused slots may need to pass before a successful random access is accomplished. These unused slots represent wasted communication capacity.

Accordingly, a need exists for a communication method that provides increased utilization of a communication resource by a plurality of communication units with widely varying communication requirements. This need can be substantially met by a communication method that provides an opportunity for communication units to choose from a set of available multiple access methods.

SUMMARY OF THE INVENTION

Briefly, according to the invention, a method of providing a communication unit multiple ways to utilize a communication resource is provided. The communication resource is subdivided as a function of time into a plurality of time slots. These time slots may be further subdivided on a non-periodic basis into a number of sub-slots. During a slot or sub-slot, communication units may utilize the communication resource according to a specific set of access methods defined for that slot or sub-slot.

BRIEF DESCRIPTION OF THE DRAWINGS

FIGS. 2A to 2C show a channel format of the communication system of FIG. 1 according to the present invention.

FIG. 4 is an operation flow chart of the base station of FIG. 1 according to the present invention.

DESCRIPTION OF A PREFERRED EMBODIMENT

Figure 1:
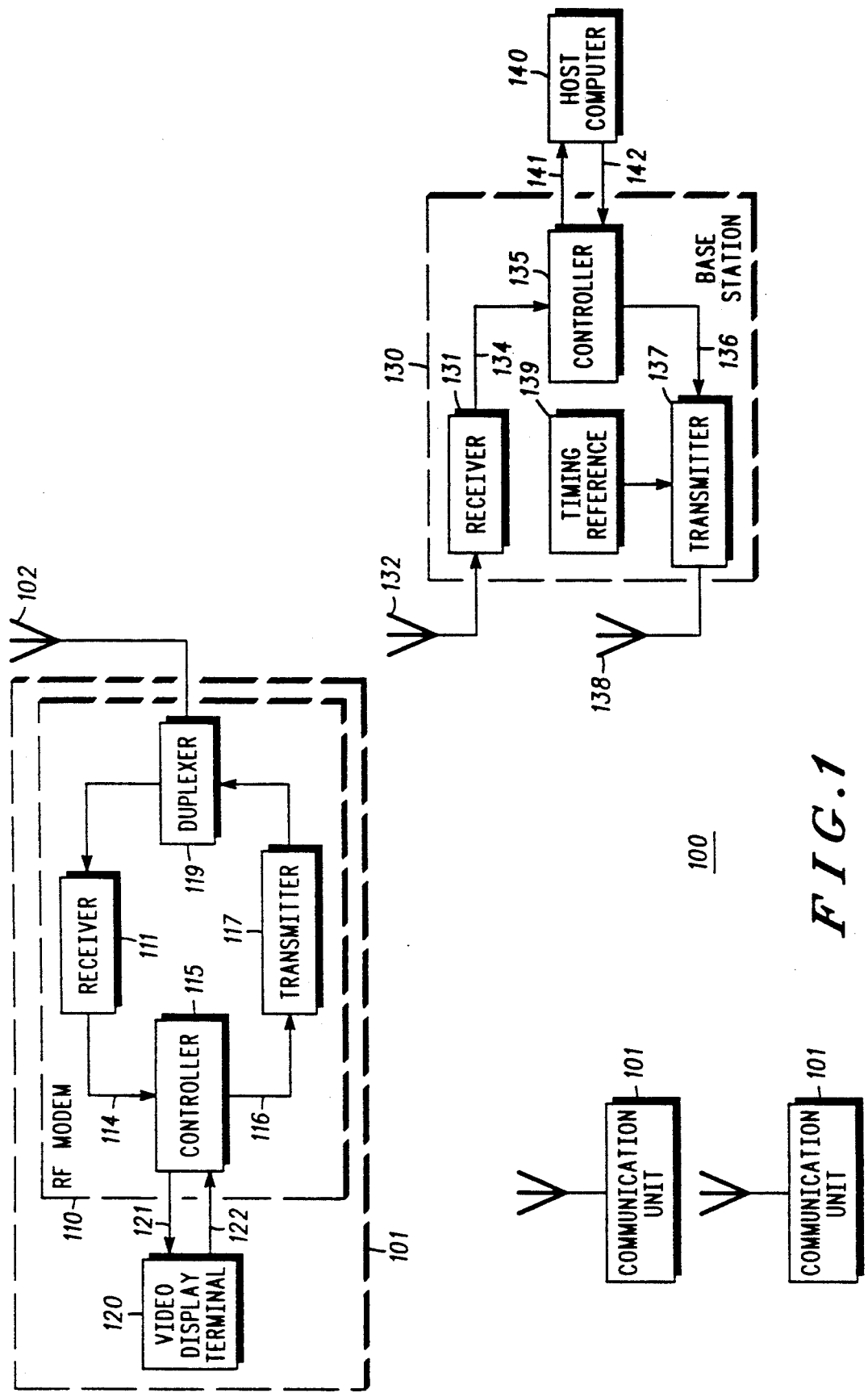
FIG. 1 comprises a block diagram of a communication system utilizing the principles of the present invention.

Referring to FIG. 1, a communication system (100) provides for communications between a plurality of communication units (101) and a base station (130). The base station (130) connects to a host computer (140) to which communication messages from the communication units (101) are delivered and from which communication messages directed to the communication units (101) are accepted. A communication unit (101) in this embodiment is comprised of a video display terminal (120) and an RF modem (110). The user of the communication unit (101) interacts with the video display terminal (120) (or other appropriate display and input device or devices) to exchange data messages with the host computer (140). The RF modem (110) operates to appropriately process the communication messages for exchange with the base station (130). As depicted in FIG. 1, the communication units (101) are substantially mobile and communicate with the base station (130) via a radio frequency (RF) communication channel. Those of appropriate skill in the art should appreciate that the present invention may be applied to any communication system where a plurality of communication units share a common communication channel, for example a local area network.

The communication messages within the communication system (100) comprise inbound and outbound information and control packets that are communicated on an RF communication channel. The information contained in the communication packets may comprise any appropriately formatted data. As described herein, an RF communication channel comprises a pair of radio spectrum bands, appropriately separated in frequency, such that one band is utilized for inbound communications and the other band is utilized for outbound communications.

The RF communication channel is divided using Time Division Multiplexing (TDM) into a plurality of time slots that may be used by the communication units according to a specific set of allowed access modes. In the preferred embodiment, at least some of the time slots may be reserved for use by the communication units for the exchange of information packets. Furthermore, the time slots on the inbound channel are further subdivided, on a non-periodic basis, into at least two subslots that may also be used by the communication units according to another set of allowed access modes. The further subdivisions are non-periodic, at least in part, due to system loading conditions; during heavily loaded operation, further subdivision will occur less often than during lightly loaded operation. In general, any number of different sub-slot divisions, and corresponding allowed access modes, may be defined. In the preferred embodiment, when the inbound communication channel is not currently reserved for the transmission of information packets, the time slots are subdivided into two subslots, during which one of two distinct types of packets may be transmitted pursuant to a particular class of random access methods. This class contains in the embodiment, two distinct access methods. The first method comprises a reservation request access method, and the second method comprises an unreserved data packet transmission access method. In the first method control packets are sent to secure reservations for exclusive use of subsequent inbound time slots for transmission of information packets. In the second method, unreserved information packets comprising a self-contained data message are transmitted in the subslot without a reservation.

Outbound communication packets (i.e., those originating at the host computer (140) and directed to the communication units (101)) are suitably formatted for RF transmission at the base station (130) and transmitted to the communication units (101) via the outbound RF communication channel. Since packets traversing this communication path have only one source, the host computer (140), the packets are transmitted by the base station (130) without contention.

On the other hand, the communication units (101) must compete with one another for the opportunity to transmit communication packets to the host computer (140) on the inbound RF communication channel. As will be described later, according to the present invention the RF modem (110) and the base station (130) operate to provide orderly and efficient use of the shared communication channel by the communication units (101).

The RF modem (110) includes an RF receiver (111) that couples to an appropriate antenna (102) via a duplexer (119) to receive RF communication signals and provide a received signal (114) to a controller (115). The controller (115) operates on the received signal (114) in a known manner to separate the user and control data portions of the received signal (114). The user data signal (121) is applied to the video display terminal (120), which processes the user data signal for display to the user. The transmit user data (122) from the video display terminal (120) is applied to the controller (115). The controller (115) operates in a manner to be described later to control transmission of the user data (122) according to the information contained in the control data portion of the received signal (114) previously applied to the controller (115). Accordingly, the controller (115) appropriately formats the transmit user data (122) and adds appropriate control data to provide the transmit signal (116). The transmit signal (116) is applied to a well known RF transmitter (117) that appropriately modulates and amplifies the transmit signal (116) for transmission by the antenna (102) via the duplexer (119).

The base station (130) includes an RF receiver (131) that couples to an appropriate receive antenna (132) to receive RF communication signals and provide a received signal (134) to the controller (135). The controller (135) operates on the received signal (134) in a known manner to separate the user and control data portions of the received signal (134). As will be described later, the control data portion of the received signal (134) is processed by the controller to provide a return control data signal for transmission to the RF modem (110). The user data signal (141) is applied to the host computer (140). A transmit user data signal (142) from the host computer (140) is applied to the controller (135). The controller (135) combines appropriate transmit control data with the transmit user data (142) to form the transmit signal (136) that is applied to the RF transmitter (137). The transmitter (137), being synchronized by a timing reference (139), appropriately modulates and amplifies the transmit signal (136) for transmission by an appropriate transmit antenna (138), as well understood in the art.

Referring to FIG. 2a, the communication channel format (200) is shown. The channel, including both the receive and transmit frequencies, is generally divided into repetitive time frames (205) that are further divided into a plurality of time slots (210). The time slots (210) are used for transmission of inbound and outbound data packets. The time slots may be further subdivided, on a non-periodic basis, into a plurality of sub-slots. In the preferred embodiment, when no reserved inbound user data packet is currently being transmitted in a time slot, that time slot comprising a portion of the inbound channel is further subdivided into two subslots (220). These subslots (220) may be used by communication units (101) to transmit random access control packets for the purpose of reserving a subsequent time slot (210) in which to transmit a data packet. Alternatively, the sub-slots may be used for the transmission of unreserved data packets.

FIG. 2b shows exemplary time slot formats for the inbound communication channel according to the preferred embodiment. When the channel is available for random access, the inbound time slot is subdivided into two random access subslots (230). The random access subslots include a guard time field (231) to avoid interference between adjacent time slots. A sync field (232) provides information to enable proper slot and bit timing to be recovered at the RF receiver. The communication unit may then use any random access subslot for the transmission of a reservation packet or an unreserved data packet.

The reservation packet comprises a control message that indicates to the receiving base station (130) that an RF modem (110) has a data packet to send using reserved access. An RF modem desiring to transmit a data packet in this mode may transmit a reservation packet in either of the two random access subslots (230). The reservation packet contains at least a unit identifier and a data packet length indicator. The identifier permits the base station to determine which communication unit (101) is requesting channel access. The data packet length indicator relates to the size of the packet that the RF modem desires to send. The base station may use this information to determine how many time slots are required for transmission of the packet.

When a valid reservation packet is received at the base station (130), the time slot (210) configuration can be switched from random access to reserved access. Under reserved access, the time slot format is as depicted by the numeral 240. The guard time and sync fields achieve the same purposes as that described in association with the random access subslots. Whenever a time slot is designated for reserved access, only the single communication unit (101) for whom the time slot was reserved is permitted to transmit packets in that time slot. The data packet comprises the user data information to be delivered to the host computer (140). The size of the user data information may dictate that several reserved access time slots (240) are required to completely transmit the packet. To accommodate messages requiring more than one reserved access time slot, one or more time slots may be reserved in multiple frames. Accordingly, the reserved time slots maintain the reserved access configuration (240) until the transmission of the data packet is complete, after which the time slots revert to the random access format.

The unreserved data packet contains user data information to be delivered to the host computer (140). An RF modem desiring to send a data packet without a reservation may transmit an unreserved data packet in one of the two random access subslots (230). When a valid unreserved data packet is received at the base station (130), it is processed as received user data, and the time slot (210) configuration continues to be random access. Whenever a time slot is designated for random access, any of the plurality of communication units (101) is permitted to transmit reservation or unreserved data packets in that time slot.

Referring to FIG. 2c, the outbound time slot format (250) includes a sync field (251), a status feedback field (252) and a data packet. The sync field achieves the same purpose as that described in association with the inbound channel configurations. The data packet comprises user data information received at the base station (130) from the host computer (140) to be delivered to the communication units (101). The status feedback information comprises information that enables the operation of the inbound channel access protocol. The status feedback information is determined by the base station controller (135) and includes the current state of at least one of the inbound time slots, either random access or reserved access. If the channel state is reserved, the status feedback further includes a communication unit identifier that permit communication units (101) to determine which communication unit (101) has the time slot reservation.

Figure 3:
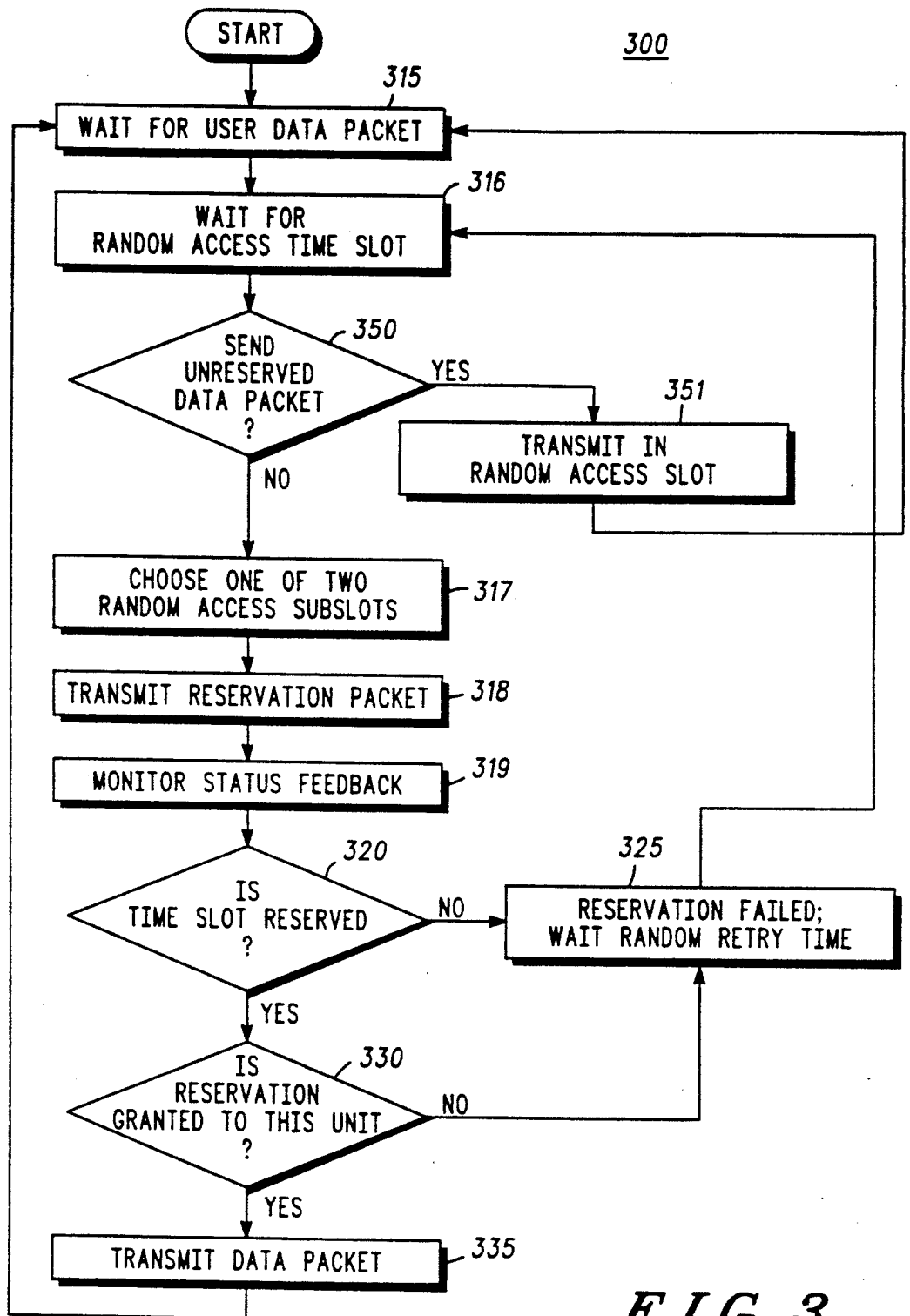
FIG. 3 is an operation flow chart of the RF modem of FIG. 1 according to the present invention.

Referring to FIG. 3, operation (300) of the communication unit controller (115) will now be described. The controller begins (315) by waiting for user data to be received from the video display terminal (120) or other input device of choice. Upon receiving the data packet, the controller waits (316) for the occurrence of a random access time slot on the inbound communication channel. When a random access time slot is found, the controller takes different actions depending on whether it intends to send a reservation request or an unreserved data packet (350). This determination may be made on the basis of data packet size or appropriate control signals received from the user.

If an unreserved data packet is to be sent, the controller transmits the unreserved data packet in the available random access time slot (351). If a reservation request is to be sent, the controller chooses one of the two random access subslots in which to transmit a reservation packet (317), which is then transmitted in (318). The controller then monitors for status feedback on the outbound communication channel (319). First it is determined if the time slot is now reserved (320). If not, the reservation attempt has failed, and after waiting an appropriate length of time (325), the controller returns to (316) to resend the reservation packet. If the time slot is reserved, the reservation identifier portion of the status feedback is examined to determine if the reservation has been granted to this communication unit (330). If the time slot is reserved for this unit, the user data packet may then be transmitted in the reserved time slot (335). If the reservation is not for this unit, the reservation attempt has failed and the controller proceeds (325) to attempt a new reservation.

Referring to FIG. 4, the operation (400) of the base station controller (135) will now be described. The controller begins by configuring the inbound time slot for random access (415). The controller then waits to receive inbound random access data transmissions from the communication units (101) (416). When data is received in a random access slot, the controller determines if there are valid unreserved user data transmissions in the slot (480). If so, the controller processes the user data (481). It then goes on to process any reservation requests.

The number of reservation requests is examined (420 and 430). If more than one reservation request was received (420), the controller chooses one of the reservation requests to be granted reserved access (425). If only one request was received (430), the requesting unit is provided with the reservation. If no requests were received, the controller returns (415) to receive future requests or unreserved data transmissions.

When a request exists, the current status feedback is formatted to indicate the new reservation (440). The status feedback is transmitted on the outbound communication channel enabling the communication unit (101) to transmit the reserved access data packet, which is then received by the base station (450). After the data packet is completely received, no more reservations are currently required. The controller then returns (415) and restores the time slot to random access format to enable new reservation requests or unreserved data packets to be received.

Accordingly, the present invention operates to provide orderly and efficient access to a shared TDM communication channel by a plurality of communication units (101). This is done by subdividing the communication resource in time on a non-periodic basis into slots and sub-slots, and allowing the communication units various means of allowed access to these slots and sub-slots. In one embodiment, the communication units (101) may request exclusive access to reserved time slots via the transmission of reservation requests in random access subslots, or they may transmit data without reservation in those same random access subslots. The random access subslots are provided by subdivision of time slots on the communication channel that are not currently being used to transmit reserved access user messages.

What is claimed is:

1. A method for using a communication resource, comprising the steps of:
   A) subdividing the communication resource as a function, at least in part, of time, to provide a plurality of time slots;
   B) non-periodically subdividing at least one of the plurality of time slots into at least two random access sub-slots;
   C) upon receiving a request from a requesting communication unit, during any one of the random access sub-slots, for at least one reserved time slot providing at least one of the plurality of time slots as a reserved time slot to the requesting communication unit when available;
   D) upon receiving data from a non-requesting communication unit, during any one of the random access sub-slots, processing the data and not providing a reserved time slot to the non-requesting communication unit.

2. The method of claim 1, wherein step C includes the step of:
   C1) when a reserved time slot is provided, receiving a data packet from the requesting communication unit in the at least one reserved time slot.

3. The method of claim 1, wherein:
   step B includes the steps of:
   B1) receiving a request from a requesting communication unit during one of the at least two random access sub-slots; and
   B2) receiving other data from a non-requesting communication unit during a different one of the at least two random access sub-slots.

4. The method of claim 3, wherein the requesting communication unit is a different communication unit than the non-requesting communication unit.

5. The method of claim 1, wherein:
   step B includes the steps of:
   B1) receiving first other data from a first non-requesting communication unit during one of the at least two random access sub-slots; and
   B2) receiving second other data from a second non-requesting communication unit during a different one of the at least two random access sub-slots; and
   step D includes the step of processing the first and second other data from the first and second non-requesting communication units and not providing a reserved time slot to the first and second non-requesting communication units.

6. The method of claim 5, wherein the first non-requesting communication is different than the second non-requesting communication unit.

7. A method of accessing a communication resource, comprising the steps of:
   A) determining whether the communication resource is available for random access, such that at least one random access subslot is provided;
   B) upon determining that the communication resource is available for random access, choosing to access the communication resource according to one of a plurality of access methods, wherein said plurality of access methods includes:

i) a first method comprising requesting at least one reserved time slot using the at least one random access subslot; and ii) a second method comprising transmitting an unreserved data packet using the at least one random access subslot;

C) upon choosing to access the communication resource by the first method:

i) choosing one of the at least one random access subslots;

ii) transmitting in the chosen random access subslot a request for at least one reserved time slot;

D) upon choosing to access the communication resource by the second method, choosing one of the at least one random access subslots to be used for transmission of an unreserved data packet.

8. The method of claim 7, wherein step D further includes the step of:

D1) transmitting the unreserved data packet in the chosen random access subslot.

* * * * *